United States Patent
Robertson

(10) Patent No.: US 10,131,330 B2
(45) Date of Patent: Nov. 20, 2018

(54) SYSTEMS, VEHICLES AND METHODS FOR CONTROLLING AN APPLICATION OF A PLURALITY OF TRAILER BRAKES

(71) Applicant: Toyota Motor Engineering & Manufacturing North America, Inc., Erlanger, KY (US)

(72) Inventor: Stephen L. Robertson, Surprise, AZ (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 946 days.

(21) Appl. No.: 13/901,675

(22) Filed: May 24, 2013

(65) Prior Publication Data

US 2014/0350812 A1    Nov. 27, 2014

(51) Int. Cl.
*B60T 8/17*    (2006.01)
*B60T 8/1755*    (2006.01)

(52) U.S. Cl.
CPC .......... *B60T 8/1708* (2013.01); *B60T 8/1755* (2013.01)

(58) Field of Classification Search
USPC ..................................... 701/70, 72; 280/400
See application file for complete search history.

(56) References Cited

U.S. PATENT DOCUMENTS

| | | | |
|---|---|---|---|
| 5,411,322 A | 5/1995 | Breen | |
| 6,668,225 B2 | 12/2003 | Oh et al. | |
| 6,705,684 B1 * | 3/2004 | Garvey | B60T 7/20 188/112 A |
| 7,447,585 B2 * | 11/2008 | Tandy, Jr. | B60T 8/1708 180/14.2 |
| 7,690,737 B2 | 4/2010 | Lu | |
| 8,010,252 B2 | 8/2011 | Getman et al. | |
| 8,046,147 B2 | 10/2011 | Waldbauer et al. | |
| 8,260,518 B2 * | 9/2012 | Englert | B60D 1/58 303/123 |
| 2008/0172163 A1 | 7/2008 | Englert et al. | |
| 2008/0177454 A1 | 7/2008 | Bond et al. | |
| 2009/0120747 A1 * | 5/2009 | Heise | B60T 8/1708 188/3 H |

* cited by examiner

*Primary Examiner* — Thomas G Black
*Assistant Examiner* — Ana D Thomas
(74) *Attorney, Agent, or Firm* — Dinsmore & Shohl LLP

(57) ABSTRACT

Systems, vehicles, and methods for controlling an application of a plurality of trailer brakes are disclosed. A system for controlling an application of a plurality of trailer brakes includes a processor, a memory module communicatively coupled to the processor, a trailer brake output circuit operatively coupled to the plurality of trailer brakes and communicatively coupled to the processor, a cornering attitude input communicatively coupled to the processor, and machine readable instructions stored in the memory module. When executed by the processor, the machine readable instructions cause the system to receive a cornering attitude signal from the cornering attitude input, determine when an understeer cornering attitude exists based on the received cornering attitude signal, and prevent the application of the plurality of trailer brakes by the trailer brake output circuit when the understeer cornering attitude is determined to exist.

20 Claims, 4 Drawing Sheets

SYSTEMS, VEHICLES AND METHODS FOR CONTROLLING AN APPLICATION OF A PLURALITY OF TRAILER BRAKES

TECHNICAL FIELD

The present specification generally relates to trailer brake control and, more specifically, to systems, vehicles, and methods for controlling an application of a plurality of trailer brakes based on a cornering attitude signal.

BACKGROUND

Trailers (e.g., recreational trailers, utility trailers, boat trailers, semi-trailers, and the like) may be towed by vehicles (e.g., automobiles and trucks). Such towed trailers may be equipped with a plurality of trailer brakes. Trailers equipped with a plurality of trailer brakes typically include an even number of trailer brakes, having two trailer brakes for each axle of the trailer that is equipped with trailer brakes. The plurality of trailer brakes may be electric trailer brakes or electric-over-hydraulic trailer brakes.

Electric trailer braking systems typically include a plurality of electric trailer brakes, each of which typically includes brake shoes that frictionally engage a drum when activated. In such systems, an electromagnet is typically mounted on one end of a lever in order to actuate the brake shoes. When a signal, such as an electric current, is applied to the electromagnet, the lever is pivoted as the electromagnet is drawn against the rotating brake drum, thereby actuating the electric trailer brakes.

Electric-over-hydraulic trailer braking systems include a plurality of hydraulic trailer brakes and an electric-over-hydraulic brake actuator coupled to the trailer that receives an electrical activation signal from a trailer brake controller (typically coupled to the towing vehicle) and provides hydraulic pressure to the hydraulic trailer brakes upon receipt of the electrical activation signal.

Electric braking systems and electric-over-hydraulic braking systems include a trailer brake controller coupled to the towing vehicle that controls the application of the signal to the plurality of trailer brakes, and thereby controls trailer braking.

When a trailer-vehicle combination turns, or "corners," the vehicle-trailer combination may become unstable in an understeer or oversteer condition, which may undesirably result in jackknife or plow-out. It may be desirable to control an application of the plurality of trailer brakes based on a cornering attitude signal in order to improve the stability of the vehicle-trailer combination during cornering.

Accordingly, a need exists for systems, vehicles, and methods for controlling an application of a plurality of trailer brakes during cornering.

SUMMARY

In one embodiment, a system for controlling an application of a plurality of trailer brakes includes a processor, a memory module communicatively coupled to the processor, a trailer brake output circuit operatively coupled to the plurality of trailer brakes and communicatively coupled to the processor, a cornering attitude input communicatively coupled to the processor, and machine readable instructions stored in the memory module. When executed by the processor, the machine readable instructions cause the system to receive a cornering attitude signal from the cornering attitude input, determine when an understeer cornering attitude exists based on the received cornering attitude signal, and prevent the application of the plurality of trailer brakes by the trailer brake output circuit when the understeer cornering attitude is determined to exist.

In another embodiment, a vehicle for controlling an application of a plurality of trailer brakes includes a processor, a memory module communicatively coupled to the processor, a trailer brake output circuit operatively coupled to the plurality of trailer brakes and communicatively coupled to the processor, a cornering attitude input communicatively coupled to the processor, and machine readable instructions stored in the memory module. When executed by the processor, the machine readable instructions cause the vehicle to receive a cornering attitude signal from the cornering attitude input, determine when an understeer cornering attitude exists based on the received cornering attitude signal, and prevent the application of the plurality of trailer brakes by the trailer brake output circuit when the understeer cornering attitude is determined to exist.

In yet another embodiment, a method for controlling an application of a plurality of trailer brakes includes receiving a cornering attitude signal from a cornering attitude input communicatively coupled to a processor, determining when an understeer cornering attitude exists based on the received cornering attitude signal, and preventing the application of the plurality of trailer brakes by a trailer brake output circuit when the understeer cornering attitude is determined to exist. The trailer brake output circuit is operatively coupled to the plurality of trailer brakes and communicatively coupled to the processor.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
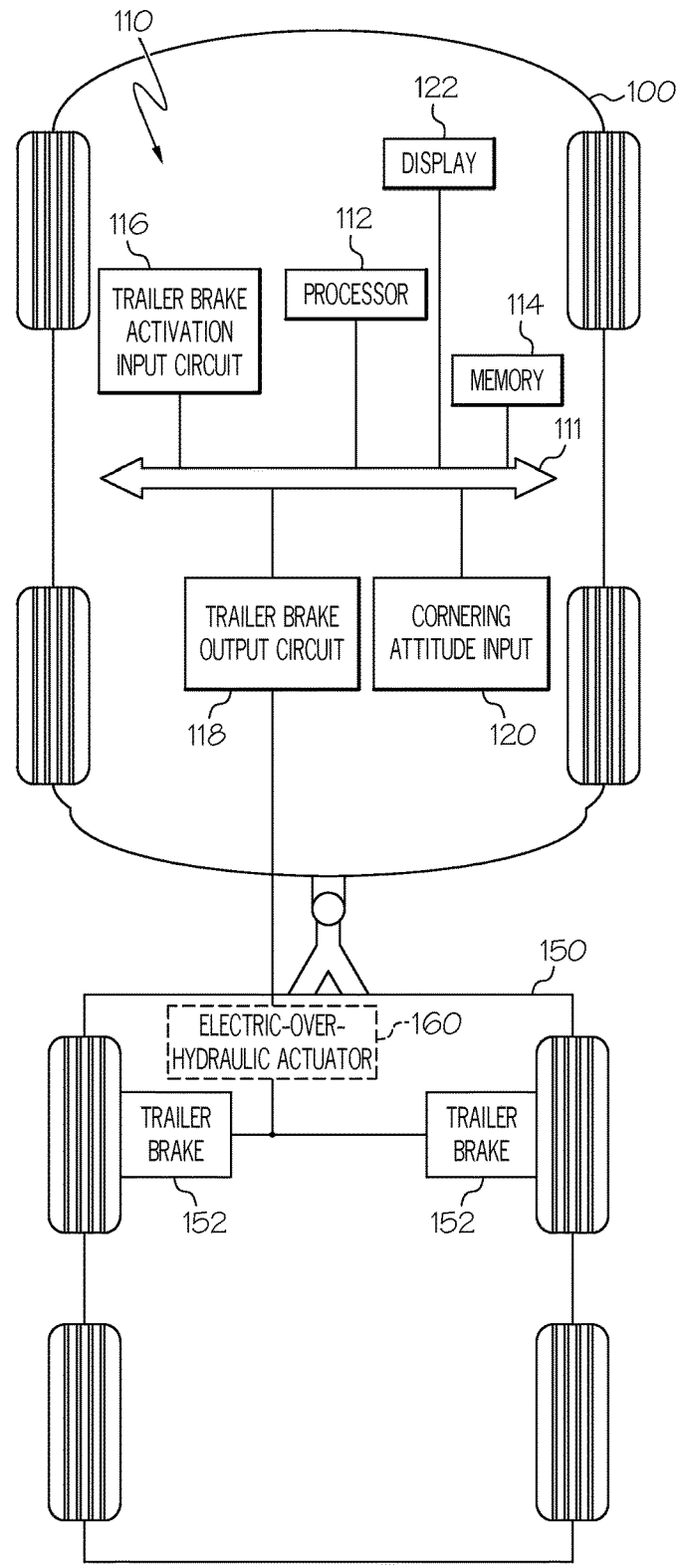
FIG. 1 schematically depicts a vehicle including a system for controlling an application of a plurality of trailer brakes based on cornering attitude data, according to one or more embodiments shown and described herein.
Figure 2:
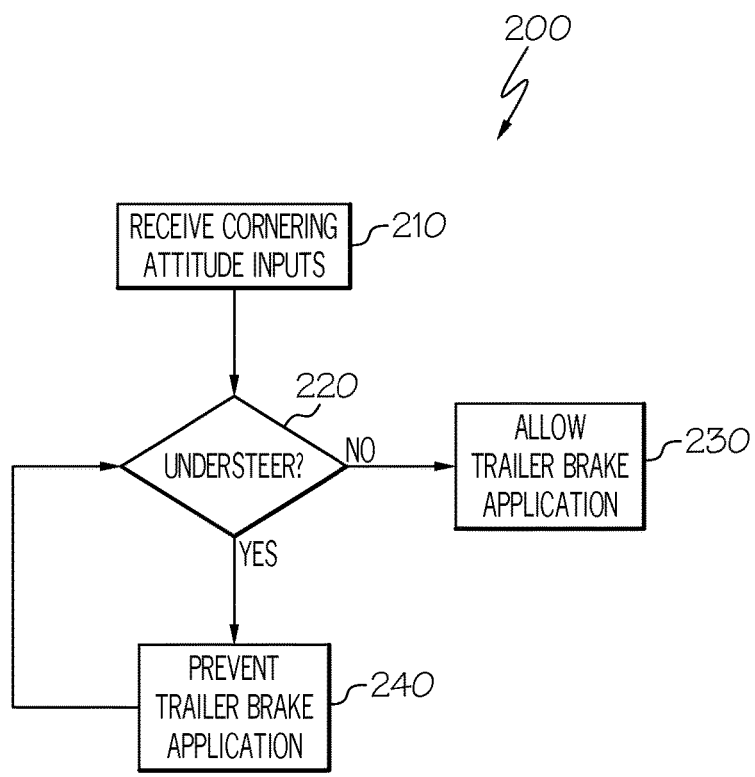
FIG. 2 schematically depicts a flowchart for controlling an application of a plurality of trailer brakes based on cornering attitude data, according to one or more embodiments shown and described herein.

The embodiments disclosed herein include systems, vehicles, and methods for controlling an application of a plurality of trailer brakes based on a cornering attitude signal. Referring generally to FIGS. 1 and 2, a system for controlling an application of a plurality of trailer brakes based on a cornering attitude signal includes a processor, a memory module, a trailer brake output circuit, a cornering attitude input, and machine readable instructions stored in the memory module. The machine readable instructions may cause the system to receive a cornering attitude signal from the cornering attitude input, determine when an understeer cornering attitude exists based on the received cornering attitude signal, and prevent the application of the plurality of trailer brakes by the trailer brake output circuit when the understeer cornering attitude is determined to exist. By preventing the application of the plurality of trailer brakes when the understeer cornering attitude is determined to exist, the stability of a vehicle-trailer combination may be enhanced, the probability of the vehicle-trailer combination recovering from the understeer cornering attitude may be enhanced, and the probability of trailer brake lockup during the understeer cornering attitude may be reduced. Furthermore, the machine readable instructions may cause the system to receive a cornering attitude signal from the cornering attitude input, determine when an oversteer cornering attitude exists based on the received cornering attitude signal, and allow the application of the plurality of trailer brakes by the trailer brake output circuit when the oversteer cornering attitude is determined to exist, thereby increasing the probability of the vehicle-trailer combination recovering from the oversteer cornering attitude. The various systems, vehicles, and methods for controlling an application of a plurality of trailer brakes based on cornering attitude will be described in more detail herein with specific reference to the corresponding drawings.

As used herein, the term "understeer cornering attitude" refers to a state of a vehicle-trailer combination in which the vehicle-trailer combination is at risk of sliding out of a turn, such as when the front of the vehicle begins to slide out while turning, which may result in instability of the vehicle-trailer combination.

As used herein, the term "oversteer cornering attitude" refers to a state of a vehicle-trailer combination in which the vehicle is at risk of turning at an angle too sharp for the trailer to follow the vehicle, which may result in instability of the vehicle-trailer combination, such as the vehicle-trailer combination folding up on itself ("jackknifing").

Referring now to FIG. 1, an embodiment of an exemplary vehicle 100 including an exemplary system 110 for controlling an application of a plurality of trailer brakes 152 of a trailer 150 connected to the vehicle 100 is schematically depicted. The vehicle 100 may be an automobile or any other passenger or non-passenger vehicle such as, for example, a tractor or a tractor truck.

The trailer 150 may be any unpowered vehicle including one or more wheels capable of being pulled by the vehicle 100 such as, for example, a recreational trailer, a utility trailer, a boat trailer, a semi-trailer, and the like. As depicted in FIG. 1, the plurality of trailer brakes 152 includes two trailer brakes, one coupled to each wheel of the front axle. However, it should be understood that in other embodiments, the plurality of trailer brakes 152 may include more than two trailer brakes, such as in embodiments in which the plurality of trailer brakes 152 includes multiple axles with two trailer brakes associated with each axle. In some embodiments in which the trailer 150 employs an electric-over-hydraulic braking system, the plurality of trailer brakes 152 may be a plurality of hydraulic trailer brakes and the trailer 150 may include an electric-over-hydraulic actuator 160 that receives an electrical activation signal from the system 110 and transforms the received electrical activation signal to a hydraulic pressure that activates the plurality of hydraulic trailer brakes, as will be described in further detail below. In embodiments in which the trailer 150 employs an electric braking system, the plurality of trailer brakes 152 may be a plurality of electric trailer brakes and the trailer 150 may not include the electric-over-hydraulic actuator 160.

The system 110 for controlling an application of a plurality of trailer brakes 152 based on a cornering attitude signal includes a communication path 111, one or more processors 112, one or more memory modules 114, a trailer brake activation input circuit 116, a trailer brake output circuit 118, a cornering attitude input 120, and an optional display 122. The various components of the system 110 and the interaction thereof will be described in detail below.

The communication path 111 may be formed from any medium that is capable of transmitting a signal such as, for example, conductive wires, conductive traces, optical waveguides, or the like. Moreover, the communication path 111 may be formed from a combination of mediums capable of transmitting signals. In one embodiment, the communication path 111 comprises a combination of conductive traces, conductive wires, connectors, and buses that cooperate to permit the transmission of electrical data signals to components such as processors, memories, sensors, input devices, output devices, and communication devices. Accordingly, the communication path 111 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 111 communicatively couples the various components of the system 110. As used herein, the term "communicatively coupled" means that coupled components are capable of exchanging data signals with one another such as, for example, electrical signals via conductive medium, electromagnetic signals via air, optical signals via optical waveguides, and the like.

Each of the one or more processors 112 of the system 110 may be any device capable of executing machine readable instructions. Accordingly, each of the one or more processors 112 may be a controller, an integrated circuit, a microchip, a computer, or any other computing device. The one or more processors 112 are communicatively coupled to the other components of the system 110 by the communication path 111. Accordingly, the communication path 111 may communicatively couple any number of processors with one another, and allow the components coupled to the communication path 111 to operate in a distributed computing environment. Specifically, each of the components may operate as a node that may send and/or receive data.

Each of the one or more memory modules 114 of the system 110 is coupled to the communication path 111 and communicatively coupled to the one or more processors 112. The one or more memory modules 114 may comprise RAM, ROM, flash memories, hard drives, or any device capable of storing machine readable instructions such that the machine readable instructions can be accessed and executed by the one or more processors 112. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 114. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 1, the trailer brake activation input circuit 116 is coupled to the communication path 111 and communicatively coupled to the one or more processors 112. The trailer brake activation input circuit 116 provides a trailer brake activation signal to the one or more processors 112 that may be processed in order to determine when the plurality of trailer brakes 152 is to be activated. In some embodiments, the trailer brake activation input circuit 116 may include one or more sensors and/or devices for generating a signal which may be utilized by the system 110 in determining whether to activate the plurality of trailer brakes 152. For example, in some embodiments, the trailer brake activation input circuit 116 may include one or more accelerometers, a vehicle brake pressure sensing circuit, a manual trailer brake activation input (e.g., a pushbutton, slider switch, and the like), a vehicle brake light circuit, or combinations thereof.

The trailer brake output circuit 118 is coupled to the communication path 111 and communicatively coupled to the one or more processors 112. In embodiments in which the trailer 150 employs an electric trailer braking system, the trailer brake output circuit 118 is electrically coupled to the plurality of trailer brakes 152 by a conductive medium, such as a conductive wire. In embodiments in which the trailer 150 employs an electric-over-hydraulic braking system, the trailer brake output circuit 118 is electrically coupled to the electric-over-hydraulic actuator 160 by a conductive medium, such as a conductive wire. The trailer brake output circuit 118 is controlled by the one or more processors 112 and supplies an output signal, such as a voltage or current, directly to the plurality of trailer brakes 152 (in embodiments in which the trailer 150 employs an electric braking system) or to the electric-over-hydraulic actuator 160 (in embodiments in which the trailer 150 employs an electric-over-hydraulic braking system) via the conductive medium when commanded by the one or more processors 112. In some embodiments, the trailer brake output circuit 118 may supply current from the power system of the vehicle 100. The trailer brake output circuit 118 generally includes one or more electrical components, such as resistors, capacitors, transistors, inductors, and the like. In some embodiments, the trailer brake output circuit 118 may include at least one power transistor, such as a MOSFET transistor.

Still referring to FIG. 1, the cornering attitude input 120 is coupled to the communication path 111 and communicatively coupled to the one or more processors 112. In some embodiments, the cornering attitude input 120 includes a vehicle stability control system, which may provide a cornering attitude signal (e.g., a message indicative of an understeer condition determined by the vehicle stability control system or a message indicative of an oversteer condition determined by the vehicle stability control system) to the system 110 via the communication path 111. In some embodiments, the cornering attitude input 120 includes a yaw rate sensor (e.g., a gyroscopic device that measures the vehicle's angular velocity around a vertical axis) or a steering wheel angle sensor (e.g., a transducer that provides a signal indicative of a position of the steering wheel). In some embodiments, the cornering attitude input 120 includes an accelerometer, which may measure lateral vehicle acceleration. The cornering attitude input 120 may provide a cornering attitude status message via the communication path 111, such as an understeer message transmitted over a vehicle bus that indicates an understeer cornering attitude or an oversteer message transmitted over the vehicle bus that indicates an oversteer cornering attitude. In some embodiments, the cornering attitude input 120 may provide a sensor output (e.g., from a yaw rate sensor, a steering wheel angle sensor, an accelerometer, or the like) that is received by the system 110 and further processed in order to determine the cornering attitude, as described in further detail below.

Referring still to FIG. 1, the exemplary system 110 comprises an optional display 122 for providing visual output such as, for example, information or notifications pertaining to the operational status of the plurality of trailer brakes 152 or information or notifications pertaining to cornering attitude status. The display 122 is coupled to the communication path 111 and communicatively coupled to the one or more processors 112. The display 122 may include any medium capable of transmitting an optical output such as, for example, light emitting diodes, a liquid crystal display, a plasma display, or the like. In some embodiments, the display 122 may include a combination meter positioned on a dashboard of the vehicle 100. It is noted that the display 122 can include at least one of the one or more processors 112 and/or at least one of the one or memory modules 114. Additionally, it should be understood that in some embodiments, the system 110 does not include the display 122, such as in embodiments in which the system 110 does not provide visual output of information or notifications pertaining to the operational status of the plurality of trailer brakes 152.

FIG. 2 schematically depicts an exemplary flowchart 200 for controlling an application of a plurality of trailer brakes 152 based on cornering attitude. Referring now to FIGS. 1 and 2, in block 210, the machine readable instructions stored in the one or more memory modules 114, when executed by the one or more processors 112, cause the system 110 to receive a cornering attitude signal from the cornering attitude input 120. In some embodiments, the cornering attitude input 120 includes a vehicle stability control system that provides cornering attitude data to the system 110 via the communication path 111. The vehicle stability control system may provide a cornering attitude status message via the communication path 111, such as an understeer message transmitted over a vehicle bus that indicates an understeer cornering attitude or an oversteer message transmitted over the vehicle bus that indicates an oversteer cornering attitude.

Still referring to block 210 of FIG. 2 in conjunction with FIG. 1, in some embodiments, the cornering attitude input 120 is a sensor, such as a yaw rate sensor, a steering wheel angle sensor, an accelerometer, or the like and the machine readable instructions stored in the one or more memory modules 114, when executed by the one or more processors 112, cause the system 110 to receive the cornering attitude signal from the sensor, which is further processed by the system 110 to determine the cornering attitude, as described below with respect to block 220.

Still referring to FIGS. 1 and 2, in block 220, the machine readable instructions stored in the one or more memory modules 114, when executed by the one or more processors 112, cause the system 110 to determine when an understeer cornering attitude exists based on the received cornering attitude signal. In embodiments in which the system 110 receives the cornering attitude status message via the communication path 111 (e.g., via a vehicle bus), the system 110 determines that an understeer cornering attitude exists when an understeer message is received at the system 110. In embodiments in which the system 110 receives the cornering attitude signal from a sensor, the system 110 utilizes the received cornering attitude signal to calculate whether an understeer cornering attitude exists, such as by determining a change in yaw rate, steering wheel angle, acceleration, or the like.

Still referring to FIGS. 1 and 2, when the understeer cornering attitude is determined not to exist in block 220, the machine readable instructions stored in the one or more memory modules 114, when executed by the one or more processors 112, cause the system 110 to allow the application of the plurality of trailer brakes 152 by the trailer brake output circuit 118 in block 230. The system 110 may allow the application of the plurality of trailer brakes 152 according to normal operation, such as in response to receiving a trailer brake activation signal from the trailer brake activation input circuit 116.

Still referring to FIGS. 1 and 2, when the understeer cornering attitude is determined to exist in block 220, the machine readable instructions stored in the one or more memory modules 114, when executed by the one or more processors 112, cause the system 110 to prevent the application of the plurality of trailer brakes 152 by the trailer brake output circuit 118 in block 240. In some embodiments, the machine readable instructions stored in the one or more memory modules 114, when executed by the one or more processors 112, cause the system 110 to prevent the application of the plurality of trailer brakes 152 by causing the trailer brake output circuit 118 to supply no output or to supply output to the plurality of trailer brakes 152 at a level below a trailer brake activation threshold level when the understeer cornering attitude is determined to exist. When an understeer cornering attitude is determined to exist in block 220, the system 110 may prevent the application of the plurality of trailer brakes 152 even when a trailer brake activation signal is received from the trailer brake activation input circuit 116, thereby preventing the application of the plurality of trailer brakes 152 under circumstances in which the system 110 would ordinarily cause the trailer brake output circuit 118 to apply the plurality of trailer brakes 152.

Still referring to block 220 of FIG. 2, by way of non-limiting example, in embodiments in which the plurality of trailer brakes 152 are electric trailer brakes electrically coupled to the trailer brake output circuit 118, the system 110 may cause the trailer brake output circuit 118 to supply no output current to the plurality of trailer brakes 152 or to supply output current to the plurality of trailer brakes 152 at a level below a trailer brake activation threshold level, thereby preventing the application of the plurality of trailer brakes 152.

Still referring to block 220 of FIG. 2, by way of another non-limiting example, in embodiments in which the trailer 150 employs an electric-over-hydraulic braking system, the system 110 may cause the trailer brake output circuit 118 to supply no output signal to the electric-over-hydraulic actuator 160 or to supply output to the electric-over-hydraulic actuator 160 at a level below a trailer brake activation threshold level, thereby preventing the application of the plurality of trailer brakes 152.

By preventing the application of the plurality of trailer brakes 152 when the understeer cornering attitude is determined to exist (as described above with respect to preventing trailer brake application in block 240 when the understeer cornering attitude is determined to exist in block 220), a moment may be applied to a hitch between the vehicle and trailer, which may combat the understeer cornering attitude, enhance the stability of a vehicle-trailer combination, enhance the probability of the vehicle-trailer combination recovering from the understeer cornering attitude, and reduce the probability of trailer brake lockup during the understeer cornering attitude. If the plurality of trailer brakes 152 were allowed to be applied during the understeer cornering attitude, the understeer cornering attitude may be undesirably intensified and the probability of the vehicle-trailer combination recovering from the understeer cornering attitude may be reduced.

Still referring to FIGS. 1 and 2, in some embodiments in which the system 110 prevents the application of the plurality of trailer brakes 152 after determining that the understeer cornering attitude exists, the system 110 may periodically or continuously check whether the understeer cornering attitude exists in block 220 until the understeer cornering attitude ceases to exist. The system 110 may continue to prevent the application of the plurality of trailer brakes 152 during an understeer duration from when the understeer cornering attitude was first determined to exist to when the understeer cornering attitude ceases to exist. By preventing application of the plurality of trailer brakes 152 during the understeer duration, the stability of the vehicle-trailer combination may be enhanced during the understeer duration, the probability of the vehicle-trailer combination recovering from the understeer cornering attitude may be enhanced, and the probability of trailer brake lockup during the understeer duration may be reduced. Once the understeer cornering attitude ceases to exist, the risk of instability and potentially detrimental effects of trailer brake lockup during understeer are mitigated and it may be desirable to allow the plurality of trailer brakes 152 to be applied again. Accordingly, in some embodiments, when the system 110 determines that the understeer cornering attitude ceases to exist in block 220, the system may allow the application of the plurality of trailer brakes 152, as described above with respect to block 230.

Referring once again to FIG. 1, the machine readable instructions stored in the one or more memory modules 114, when executed by the one or more processors 112, may cause the system 110 to determine when an oversteer cornering attitude exists based on the received cornering attitude signal. In embodiments in which the system 110 receives the cornering attitude status message via the communication path 111 (e.g., via a vehicle bus), the system 110 determines that an oversteer cornering attitude exists when an oversteer message is received at the system 110. In embodiments in which the system 110 receives the cornering attitude signal from a sensor, the system 110 utilizes the received cornering attitude signal to calculate whether an oversteer cornering attitude exists, such as by determining a change in yaw rate, steering wheel angle, acceleration, or the like. When the oversteer cornering attitude is determined to exist, the machine readable instructions stored in the one or more memory modules 114, when executed by the one or more processors 112, cause the system 110 to allow the application of the plurality of trailer brakes 152 by the trailer brake output circuit 118 in block 230. The system 110 may allow the application of the plurality of trailer brakes 152 according to normal operation, such as in response to receiving a trailer brake activation signal from the trailer brake activation input circuit 116. By allowing the application of the plurality of trailer brakes 152 during an oversteer cornering attitude, the probability of the vehicle-trailer combination recovering from the oversteer cornering attitude may be enhanced by reducing an oversteer moment at a hitch point of the vehicle-trailer, thereby reducing the possibility of jackknife.

Still referring to FIG. 1, in some embodiments in which system 110 allows the application of the plurality of trailer brakes 152 after determining that the oversteer cornering attitude exists, the system 110 may periodically or continuously check whether the oversteer cornering attitude exists in block 220 until the oversteer cornering attitude ceases to exist. The system 110 may continue to allow the application of the plurality of trailer brakes 152 during an oversteer duration from when the oversteer cornering attitude was first determined to exist and when the oversteer cornering attitude ceases to exist. By continuing to allow the application of the plurality of trailer brakes 152 during the oversteer duration, the probability of the vehicle-trailer combination recovering from the oversteer cornering attitude may be enhanced, thereby reducing the possibility of jackknife.

Figure 3:
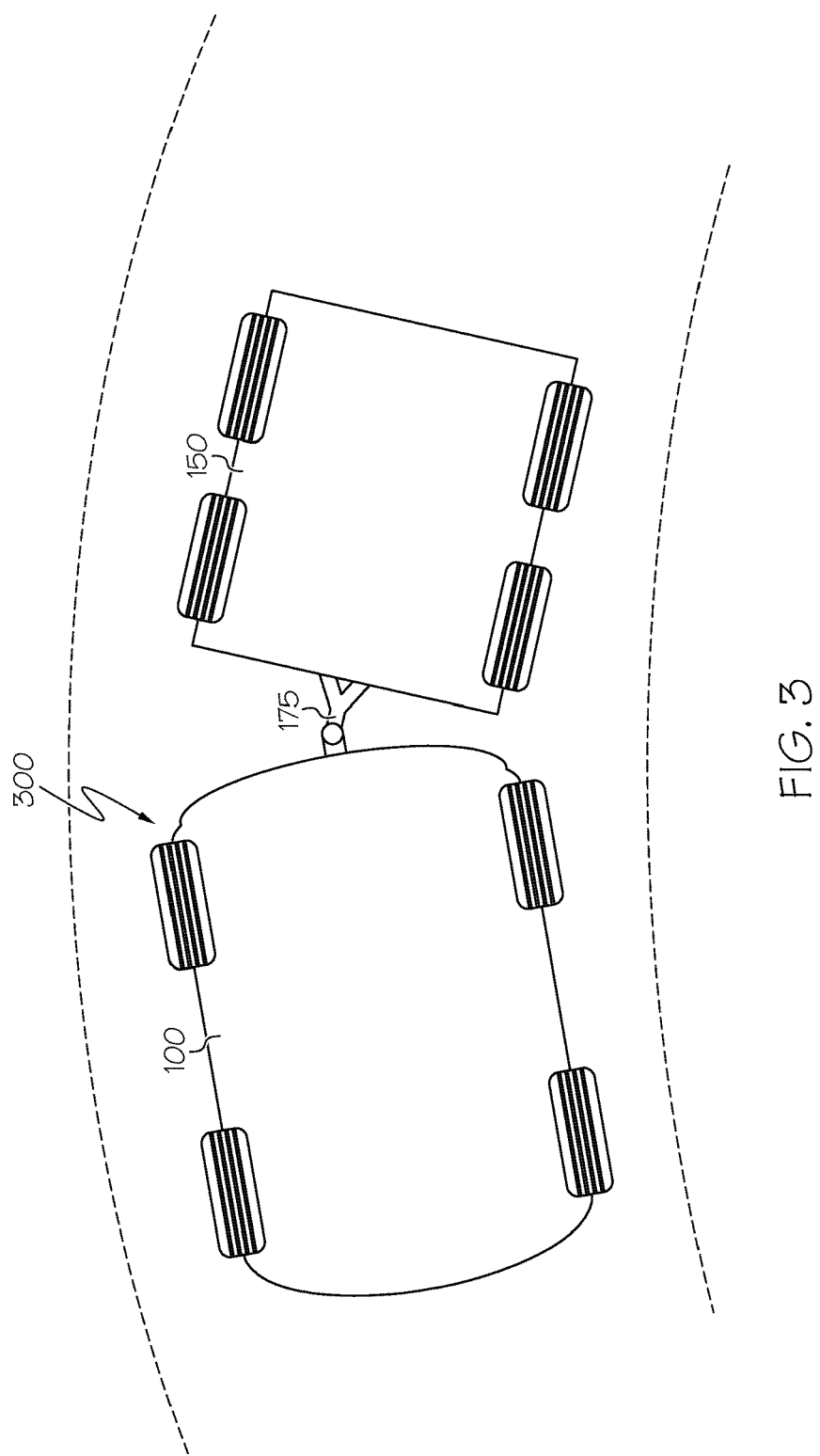
FIG. 3 schematically depicts a trailer-vehicle combination in an oversteer condition, according to one or more embodiments shown and described herein.

Referring now to FIGS. 3 and 1, a trailer-vehicle combination in an oversteer condition 300 is schematically depicted. As depicted in FIG. 3, the vehicle 100 is turning at an angle too sharp for the trailer 150 to follow the vehicle 100, which may result in instability of the vehicle-trailer combination, such as the vehicle-trailer combination jackknifing. By way of non-limiting example, the system 110 may receive a cornering attitude signal from the cornering attitude input 120, determine that an oversteer cornering attitude exists based on the received cornering attitude signal, and allow the application of the plurality of trailer brakes 152 by the trailer brake output circuit 118 when the oversteer cornering attitude is determined to exist to reduce an oversteer moment at a hitch point 175, thereby recovering from the oversteer condition 300 by straightening the vehicle-trailer combination to the configuration depicted in FIG. 1.

Figure 4:
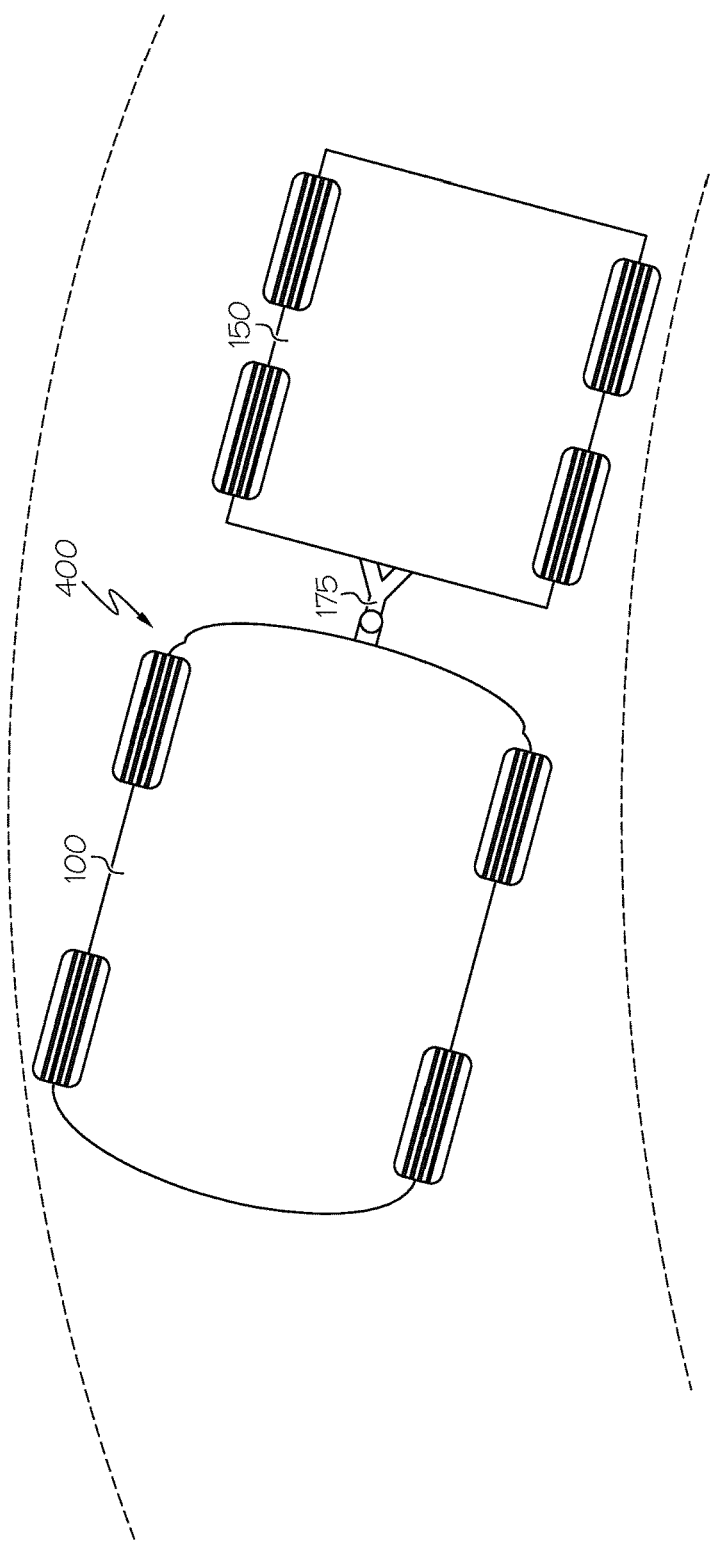
FIG. 4 schematically depicts a trailer-vehicle combination in an understeer condition, according to one or more embodiments shown and described herein.

Referring now to FIGS. 4 and 1, a trailer-vehicle combination in an understeer condition 400 is schematically depicted. As depicted in FIG. 4, the vehicle-trailer combination is turning at too shallow of an angle, which may result in instability of the vehicle-trailer combination. By way of non-limiting example, the system 110 may receive a cornering attitude signal from the cornering attitude input 120, determine that an understeer cornering attitude exists based on the received cornering attitude signal, and prevent the application of the plurality of trailer brakes 152 by the trailer brake output circuit 118 when the understeer cornering attitude is determined to exist, as described above with respect to the flowchart of FIG. 2, thereby recovering from the understeer condition 400 by straightening the vehicle-trailer combination to the configuration depicted in FIG. 1.

It should now be understood that embodiments described herein provide systems, vehicles, and methods for controlling an application of a plurality of trailer brakes based on cornering attitude. By preventing the application of the plurality of trailer brakes when the understeer cornering attitude is determined to exist, the stability of a vehicle-trailer combination may be enhanced, the probability of the vehicle-trailer combination recovering from the understeer cornering attitude may be enhanced, and the probability of trailer brake lockup during the understeer cornering attitude may be reduced. Furthermore, by allowing the application of the plurality of trailer brakes 152 during an oversteer cornering attitude as described herein, the probability of the vehicle-trailer combination recovering from the oversteer cornering attitude may be enhanced by reducing an oversteer moment at a hitch point of the vehicle-trailer, thereby reducing the possibility of jackknife.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for controlling an application of a plurality of trailer brakes comprising:
   a processor;
   a memory module communicatively coupled to the processor;
   a trailer brake output circuit operatively coupled to the plurality of trailer brakes and communicatively coupled to the processor;
   a cornering attitude input communicatively coupled to the processor;
   machine readable instructions stored in the memory module that cause the system to perform at least the following when executed by the processor:
      receive a cornering attitude signal from the cornering attitude input;
      determine when an understeer cornering attitude exists based on the received cornering attitude signal; and
      prevent the application of the plurality of trailer brakes by the trailer brake output circuit when the understeer cornering attitude is determined to exist.

2. The system of claim 1, wherein the machine readable instructions stored in the memory module cause the system to:
   prevent the application of the plurality of trailer brakes by causing the trailer brake output circuit to supply no output or to supply output to the plurality of trailer brakes at a level below a trailer brake activation threshold level when the understeer cornering attitude is determined to exist.

3. The system of claim 1, wherein the machine readable instructions stored in the memory module cause the system to:
   determine when the understeer cornering attitude ceases to exist based on the received cornering attitude signal; and
   prevent the application of the plurality of trailer brakes for an understeer duration from when the understeer cornering attitude is determined to exist to when the understeer cornering attitude ceases to exist.

4. The system of claim 1, wherein the machine readable instructions stored in the memory module further cause the system to perform at least the following when executed by the processor:
   determine when the understeer cornering attitude ceases to exist based on the received cornering attitude signal; and
   allow the application of the plurality of trailer brakes when the understeer cornering attitude ceases to exist.

5. The system of claim 1, wherein the machine readable instructions stored in the memory module further cause the system to perform at least the following when executed by the processor:
   determine when an oversteer cornering attitude exists based on the received cornering attitude signal; and
   allow the application of the plurality of trailer brakes when the oversteer cornering attitude is determined to exist.

6. The system of claim 5, wherein the machine readable instructions stored in the memory module cause the system to:
   determine when an oversteer cornering attitude ceases to exist based on the received cornering attitude signal; and
   allow the application of the plurality of trailer brakes for an oversteer duration from when the oversteer cornering attitude is determined to exist to when the oversteer cornering attitude ceases to exist.

7. The system of claim 1, further comprising a trailer brake activation input circuit communicatively coupled to the processor, wherein the machine readable instructions stored in the memory module cause the system to:
   prevent the application of the plurality of trailer brakes when the understeer cornering attitude is determined to exist and a trailer brake activation signal is received from the trailer brake activation input circuit.

8. The system of claim 1, wherein the cornering attitude input is a vehicle bus and the cornering attitude signal is a message transmitted on the vehicle bus.

9. The system of claim 1, wherein the cornering attitude input includes a yaw rate sensor and a steering wheel angle sensor.

10. The system of claim 1, wherein the trailer brake output circuit includes at least one power transistor.

11. A vehicle for controlling an application of a plurality of trailer brakes comprising:
   a processor;
   a memory module communicatively coupled to the processor;
   a trailer brake output circuit operatively coupled to the plurality of trailer brakes and communicatively coupled to the processor;
   a cornering attitude input communicatively coupled to the processor;
   machine readable instructions stored in the memory module that cause the vehicle to perform at least the following when executed by the processor:
      receive a cornering attitude signal from the cornering attitude input;
      determine when an understeer cornering attitude exists based on the received cornering attitude signal; and
      prevent the application of the plurality of trailer brakes by the trailer brake output circuit when the understeer cornering attitude is determined to exist.

12. The vehicle of claim 11, wherein the machine readable instructions stored in the memory module cause the vehicle to:
   prevent the application of the plurality of trailer brakes by causing the trailer brake output circuit to supply no output or to supply output to the plurality of trailer brakes at a level below a trailer brake activation threshold level when the understeer cornering attitude is determined to exist.

13. The vehicle of claim 11, wherein the machine readable instructions stored in the memory module further cause the vehicle to perform at least the following when executed by the processor:
   determine when the understeer cornering attitude ceases to exist based on the received cornering attitude signal; and
   allow the application of the plurality of trailer brakes when the understeer cornering attitude ceases to exist.

14. The vehicle of claim 11, wherein the machine readable instructions stored in the memory module cause the vehicle to:
   determine when the understeer cornering attitude ceases to exist based on the received cornering attitude signal; and
   prevent the application of the plurality of trailer brakes for an understeer duration from when the understeer cornering attitude is determined to exist to when the understeer cornering attitude ceases to exist.

15. The vehicle of claim 11, wherein the machine readable instructions stored in the memory module further cause the vehicle to perform at least the following when executed by the processor:
   determine when an oversteer cornering attitude exists based on the received cornering attitude signal; and
   allow the application of the plurality of trailer brakes when the oversteer cornering attitude is determined to exist.

16. The vehicle of claim 11, further comprising a trailer brake activation input circuit communicatively coupled to the processor, wherein the machine readable instructions stored in the memory module cause the vehicle to:
   prevent the application of the plurality of trailer brakes when the understeer cornering attitude is determined to exist and a trailer brake activation signal is received from the trailer brake activation input circuit.

17. A method for controlling an application of a plurality of trailer brakes comprising:
   receiving a cornering attitude signal from a cornering attitude input communicatively coupled to a processor;
   determining, automatically by the processor, when an understeer cornering attitude exists based on the received cornering attitude signal; and
   preventing, automatically by the processor, the application of the plurality of trailer brakes by a trailer brake output circuit when the understeer cornering attitude is determined to exist, wherein the trailer brake output circuit is operatively coupled to the plurality of trailer brakes and communicatively coupled to the processor.

18. The method of claim 17, further comprising preventing the application of the plurality of trailer brakes by causing the trailer brake output circuit to supply no output or to supply output to the plurality of trailer brakes at a level below a trailer brake activation threshold level when the understeer cornering attitude is determined to exist.

19. The method of claim 17, further comprising:
   determining when the understeer cornering attitude ceases to exist based on the received cornering attitude signal; and
   allowing the application of the plurality of trailer brakes when the understeer cornering attitude ceases to exist.

20. The method of claim 17, further comprising:
   determining when the understeer cornering attitude ceases to exist based on the received cornering attitude signal;
   preventing the application of the plurality of trailer brakes for an understeer duration from when the understeer cornering attitude is determined to exist to when the understeer cornering attitude ceases to exist;
determining when an oversteer cornering attitude ceases to exist based on the received cornering attitude signal; and
allowing the application of the plurality of trailer brakes for an oversteer duration from when the oversteer cornering attitude is determined to exist to when the oversteer cornering attitude ceases to exist.

\* \* \* \* \*